(12) United States Patent
Nakai et al.

(10) Patent No.: US 12,546,735 B2
(45) Date of Patent: Feb. 10, 2026

(54) IMPURITY DETECTION SUPPORT DEVICE AND IMPURITY DETECTION SUPPORT METHOD (71) Applicant: Panasonic Intellectual Property Management Co., Ltd., Osaka (JP)

(72) Inventors: Miyuki Nakai, Osaka (JP); Yuko Ogawa, Osaka (JP); Toshiro Kume, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 166 days.

(21) Appl. No.: 18/281,249

(22) PCT Filed: Dec. 1, 2021

(86) PCT No.: PCT/JP2021/044045
§ 371 (c)(1),
(2) Date: Sep. 8, 2023

(87) PCT Pub. No.: WO2022/190482
PCT Pub. Date: Sep. 15, 2022

(65) Prior Publication Data
US 2024/0151672 A1 May 9, 2024

(30) Foreign Application Priority Data
Mar. 11, 2021 (JP) .................. 2021-039315

(51) Int. Cl.
*G01N 27/08* (2006.01)
*G01N 27/07* (2006.01)
(Continued)

(52) U.S. Cl.
CPC ............ *G01N 27/07* (2013.01); *G01N 27/08* (2013.01); *G01N 27/20* (2013.01); *G01R 27/22* (2013.01);
(Continued)

(58) Field of Classification Search
CPC ........ G01N 27/07; G01N 27/08; G01N 27/20; G01N 27/10; G01N 33/32; G01R 27/22;
(Continued)

(56) References Cited

U.S. PATENT DOCUMENTS 7,106,075 B2      9/2006  Hu
2004/0239344 A1  12/2004  Hu
2017/0307580 A1* 10/2017  Kim .................. G01N 27/08

FOREIGN PATENT DOCUMENTS

CN    109115838 A       1/2019
DE    102018108601 A1  10/2019
(Continued)

OTHER PUBLICATIONS

Extended European Search Report received in EP Patent Application No. 21930328.6, dated Jun. 27, 2024.
(Continued)

*Primary Examiner* — Feba Pothen
(74) *Attorney, Agent, or Firm* — Rimon P.C.

(57) ABSTRACT

An impurity detection support device includes: a pipe in which a liquid under test flows; a first electrode and a second electrode provided in the pipe, the first electrode and the second electrode being arranged such that an AC voltage is adapted to be applied to or an AC current is adapted to be superimposed on the liquid under test in a space extending between a first position and a second position; a power supply unit that applies an AC voltage or superimposes an AC current between a pair of electrodes; a measurement unit that measures a current or a voltage generated between the pair of electrodes; and a calculation unit that calculates a resistance of the liquid under test using a measurement result of the measurement unit.

27 Claims, 4 Drawing Sheets (51) Int. Cl.
  *G01N 27/20* (2006.01)
  *G01R 27/22* (2006.01)
  *H01M 4/70* (2006.01)
  *G01N 27/10* (2006.01)
  *G01N 33/32* (2006.01)

(52) U.S. Cl.
  CPC .............. *H01M 4/70* (2013.01); *G01N 27/10* (2013.01); *G01N 33/32* (2013.01)

(58) Field of Classification Search
  CPC .......... H01M 4/70; H01M 4/04; H01M 4/139; Y02E 60/10
  See application file for complete search history.

(56) References Cited

FOREIGN PATENT DOCUMENTS

| | | | | |
|---|---|---|---|---|
| EP | 3032245 | A | 6/2016 | |
| JP | 2004-537737 | A | 12/2004 | |
| WO | WO-0045148 | A1 * | 8/2000 | .............. F17D 5/06 |
| WO | 02/40982 | A1 | 5/2002 | |
| WO | 2014/142045 | A1 | 9/2014 | |
| WO | 2015/019634 | A1 | 2/2015 | |

OTHER PUBLICATIONS

International Search Report issued in corresponding International Application No. PCT/JP2021/044045, dated Feb. 15, 2022, with English translation.

* cited by examiner

IMPURITY DETECTION SUPPORT DEVICE AND IMPURITY DETECTION SUPPORT METHOD

CROSS-REFERENCE TO RELATED APPLICATIONS

This application is the U.S. National Phase under 35 U.S.C. § 371 of International Patent Application No. PCT/JP2021/044045, filed on Dec. 1, 2021, which in turn claims the benefit of Japanese Patent Application No. 2021-039315, filed on Mar. 11, 2021, the entire content of each of which is incorporated herein by reference.

BACKGROUND

Field of the Invention

The present disclosure relates to an impurity detection support device and an impurity detection support method.

Description of the Related Art

When a solid-liquid mixture having electronic conductivity is produced, conductive particles such as metal particles may be mixed as impurities. In the case a solid-liquid mixture containing conductive impurities is used in an electronic device, impurities may cause failure of the electronic device. Examples of the electronic device include a power storage device such as a lithium ion battery, a lithium ion secondary battery, an alkaline dry battery, an electric double layer capacitor, and an electrochemical capacitor. Examples of the solid-liquid mixture include an electrode slurry used in these power storage devices. When conductive impurities are mixed in the electrode slurry, the conductive impurities can cause a short circuit between the positive and negative electrodes, etc. In this background, Patent literature 1, for example, discloses a method for magnetically detecting a metal foreign substance contained in an aqueous slurry containing an electrode active material and a particulate binder.
Patent literature 1: WO2014/142045

The related-art method for detecting conductive impurities by using magnetism has not been able to detect conductive impurities comprised of non-magnetic materials. Therefore, the related-art method has insufficient rate of detection of conductive impurities.

SUMMARY OF THE INVENTION

The present disclosure addresses the issue described above, and a purpose thereof is to provide a technique for increasing the rate of detection of conductive impurities in a liquid under test.

An aspect of the present disclosure relates to an impurity detection support device. The device includes: a pipe in which a liquid under test flows; a first electrode and a second electrode provided in the pipe, the first electrode and the second electrode being arranged such that an AC voltage is adapted to be applied to or an AC current is adapted to be superimposed on the liquid under test in a space extending between a first position of the pipe and a second position shifted from the first position in a direction of extension of the pipe; a power supply unit that applies an AC voltage or superimposes an AC current between the first electrode and the second electrode; a measurement unit that measures a current generated between the first electrode and the second electrode due to application of the AC voltage or measures a voltage generated between the first electrode and the second electrode due to superposition of the AC current; and a calculation unit that calculates a resistance of the liquid under test using a measurement result of the measurement unit, the resistance being an indicator for determining whether or not the liquid under test contains conductive impurities.

Another aspect of the present disclosure relates to an impurity detection support method. The method includes: causing a liquid under test to flow in a pipe; applying an AC voltage to or superimposing an AC current on the liquid under test in a space extending between a first position of the pipe and a second position shifted from the first position in a direction of extension of the pipe; measuring a current generated due to application of the AC voltage or measuring a voltage generated due to superposition of the AC current; and calculating a resistance of the liquid under test using a measurement result, the resistance being an indicator for determining whether or not the liquid under test contains conductive impurities.

Optional combinations of the aforementioned constituting elements, and implementations of the disclosure in the form of methods, apparatuses, and systems may also be practiced as additional aspects of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Hereinafter, the present disclosure will be described based on preferred embodiments with reference to drawings. The embodiments do not limit the scope of the present disclosure but exemplify the disclosure. Not all of the features and the combinations thereof described in the embodiments are necessarily essential to the present disclosure. Identical or like constituting elements, members, processes shown in the drawings are represented by identical symbols and a duplicate description will be omitted as appropriate.

The scales and shapes shown in the figures are defined for convenience's sake to make the explanation easy and shall not be interpreted limitatively unless otherwise specified. Terms like "first", "second", etc. used in the specification and claims do not indicate an order or importance by any means unless otherwise specified and are used to distinguish a certain feature from the others. Those of the members that are not important in describing the embodiment are omitted from the drawings.

Embodiment 1

Figure 1:
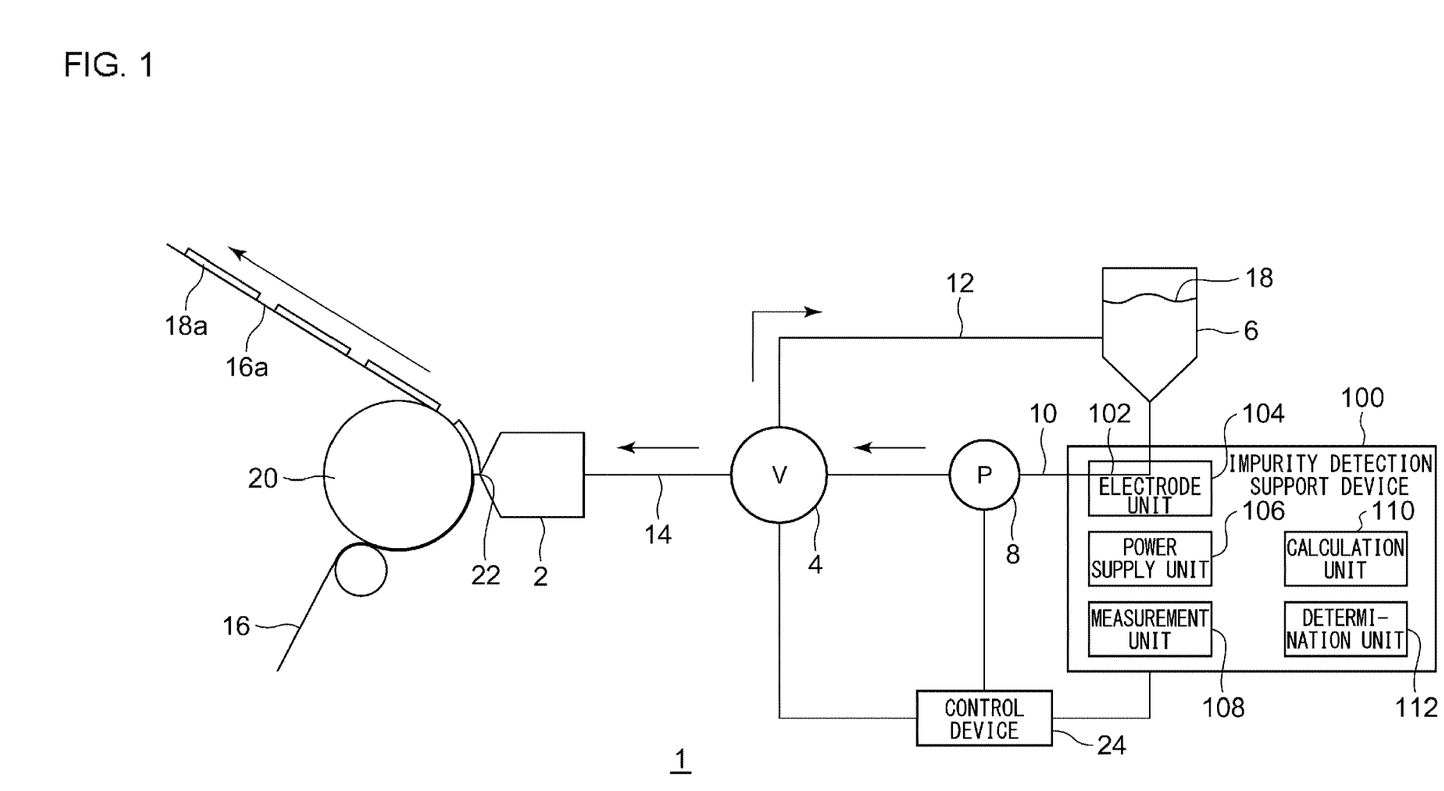
FIG. 1 is a schematic diagram of a coating device in which an impurity detection support device according to embodiment 1 is provided.

FIG. 1 is a schematic diagram of a coating device 1 in which an impurity detection support device 100 according to embodiment 1 is provided. FIG. 1 depicts some of the constituting elements of the respective devices as functional blocks. The functional blocks are implemented in hardware such as devices and circuits exemplified by a CPU and a memory of a computer, and in software such as a computer program. It will be understood by those skilled in the art that these functional blocks are implemented in a variety of manners by a combination of hardware and software.

The coating device 1 includes a coating die 2, a valve 4, a tank 6, a pump 8, a feed pipe 10, a return pipe 12, and a die supply pipe 14.

The coating die 2 is an instrument for applying a paint 18 to a coated body 16. The coating device 1 of the present embodiment is used, by way of one example, to manufacture an electrode plate of a secondary battery. An electrode plate of a secondary battery is a sheet-shaped electrode material obtained by applying an electrode slurry to a current collector and drying the resultant product. In the present embodiment, therefore, the coated body 16 is a current collector of a secondary battery, and the paint 18 is an electrode slurry of a secondary battery. The current collector is, for example, a metal foil. The electrode slurry is an electronically conductive solid-liquid mixture containing a solvent and at least one of an electrode active material or a conductive additive. In the case of common lithium ion secondary batteries, the positive electrode plate is produced by coating an aluminum foil with an electrode slurry containing a positive electrode active material such as lithium cobalt oxide and lithium iron phosphate. The slurry for the positive electrode may contain a conductive additive such as graphite. Further, the negative electrode plate is produced by coating a copper foil with an electrode slurry containing a negative electrode active material (or conductive additive) such as graphite.

The coating die 2 is arranged such that a discharge port 22 faces the circumferential surface of a backup roll 20 at a predetermined interval. The coated body 16 is continuously transported by the rotation of the backup roll 20 to a position where the backup roll 20 and the discharge port 22 face each other.

A valve 4 is connected to the coating die 2 via the die supply pipe 14. The valve 4 can switch between supply and non-supply of the paint 18 to the coating die 2. The coating device 1 can discharge the paint 18 from the coating die 2 to the coated body 16 while the paint 18 is being supplied to the coating die 2. The tank 6 is connected to the valve 4 via the feed pipe 10 and the return pipe 12.

The tank 6 stores the paint 18. The feed pipe 10 is provided with the pump 8, and the paint 18 is driven by the pump 8 from the tank 6 to the valve 4. The valve 4 supplies the paint 18 supplied from the tank 6 to the coating die 2 via the die supply pipe 14. Alternatively, the valve 4 returns the paint 18 supplied from the tank 6 to the tank 6 via the return pipe 12.

As the valve 4 supplies the paint 18 to the coating die 2, the paint 18 can be discharged from the coating die 2 to form a coated portion 18a coated with the paint 18 on the coated body 16. Further, as the valve 4 returns the paint 18 to the tank 6, application of the paint 18 from the coating die 2 can be stopped and an uncoated portion 16a not coated with the paint 18 can be formed on the coated body 16. That is, the valve 4 can intermittently coat the paint 18 on the coated body 16. The uncoated portion 16a is used for pasting of the center lead of the electrode. The configuration of each part of the coating device 1 is not limited to the one described above.

The coating device 1 is provided with an impurity detection support device 100 according to the present embodiment. The impurity detection support device 100 includes a pipe 102, an electrode unit 104, a power supply unit 106, a measurement unit 108, a calculation unit 110, and a determination unit 112.

The pipe 102 is a flow path through which the liquid under test that is tested to determine whether or not it contains conductive impurities flows. Conductive impurities comprise, for example, a metal. In the present embodiment, the region in the feed pipe 10 between the tank 6 and the pump 8 constitutes the pipe 102. That is, the impurity detection support device 100 is provided in the feed pipe 10. Further, the paint 18, in other words, the electrode slurry, represents the liquid under test.

The impurity detection support device 100 may be provided in the region in the feed pipe 10 between the pump 8 and the valve 4. Alternatively, the impurity detection support device 100 may be provided in the return pipe 12, the die supply pipe 14, or the like. The coating device 1 can also be interpreted as including a circulation device or a transport device for the paint 18 composed of the tank 6, the pump 8, the feed pipe 10, and the return pipe 12. In this case, the impurity detection support device 100 provided in the feed pipe 10 or the return pipe 12 can be interpreted as being provided in the circulation device or the transport device. Further, the coating device 1 is not limited to the manufacture of an electrode plate of a secondary battery, and the coated body 16 and the paint 18 may not be an electrode plate and an electrode slurry. Further, the impurity detection support device 100 may be provided in a device other than the coating device 1 and, for example, in a manufacturing device for manufacturing the liquid under test.

Figure 2A:
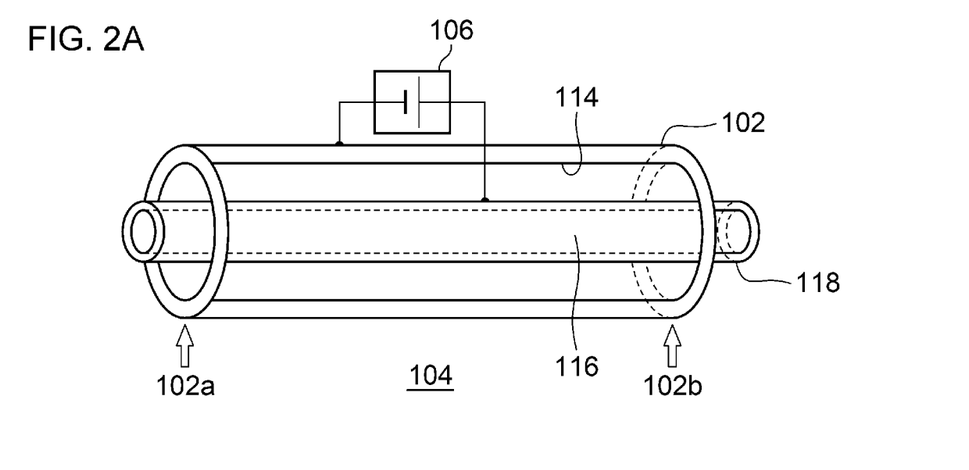
FIGS. 2A, 2B and 2C are schematic diagrams of the electrode unit.
Figure 2B:
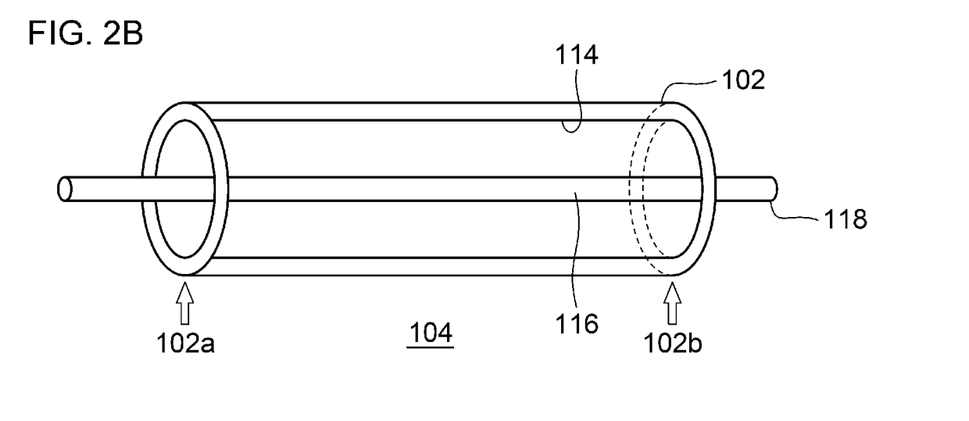
Figure 2C:
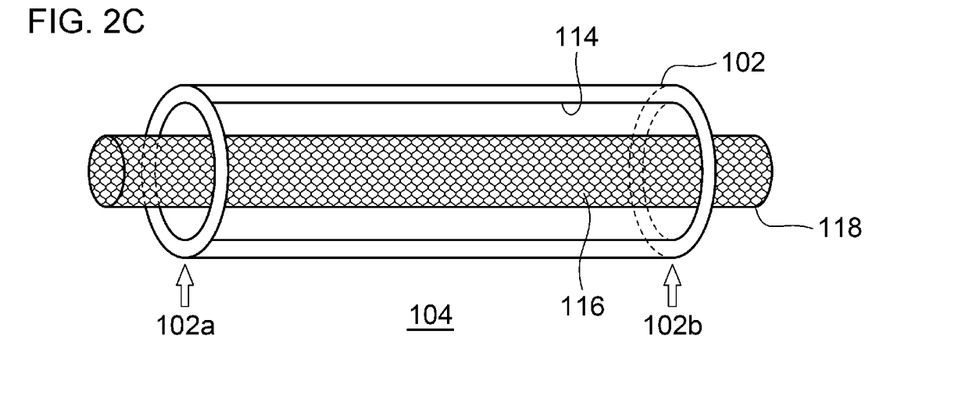

The electrode unit 104 includes a first electrode 114 and a second electrode 116. Hereinafter, the first electrode 114 and the second electrode 116 may be collectively referred to as a pair of electrodes for convenience. FIGS. 2A-2C are schematic diagrams of the electrode unit 104. FIG. 2A shows a first example of the electrode unit 104, FIG. 2B shows a second example of the electrode unit 104, and FIG. 2C shows a third example of the electrode unit 104. In FIGS. 2B and 2C, illustration of the power supply unit 106 is omitted.

A pair of electrodes is provided in the pipe 102. Further, the electrode unit 104 of the present embodiment has a rod-shaped body 118 that is inserted into the pipe 102 and arranged at an interval from the pipe 102. The first electrode 114 is provided in the pipe 102, and the second electrode 116 is provided in the rod-shaped body 118. The first electrode 114 and the second electrode 116 are insulated from each other. The first electrode 114 and the second electrode 116 are made of a material having electrical conductivity. The material has, for example, a volume resistivity of 0.1 Ω·cm or less. Specific examples of materials constituting the first electrode 114 and the second electrode 116 include insoluble metals such as stainless steel, titanium, platinum, gold, niobium, and ruthenium and include carbon. These materials can also be combined as appropriate.

The first electrode 114 is provided at least on the inner wall (inner circumferential surface) of the pipe 102. The first electrode 114 may be provided on the entire inner wall of the pipe 102 or in a part thereof. When the first electrode 114 is provided in a part of the inner wall, it may be provided in a partial region in the direction of flow of the liquid under test, or provided in a partial region in the circumferential direction of the pipe 102. Further, the entire pipe 102 may be made of an insoluble metal or the like, and the entire pipe 102 may constitute the first electrode 114. That is, the first electrode 114 may be provided only on the surface of the inner wall of the pipe 102 or may be provided inside the inner wall.

The second electrode 116 is provided at least on the outer wall (outer circumferential surface) of the rod-shaped body 118. The second electrode 116 may be provided on the entire outer wall of the rod-shaped body 118 or may be provided in a part thereof. When the second electrode 116 is provided in a part of the outer wall, it may be provided in a partial region in the direction of flow of the liquid under test, or provided in a partial region in the circumferential direction of the rod-shaped body 118. Further, the entire rod-shaped body 118 may be made of an insoluble metal or the like, and the entire rod-shaped body 118 may constitute the second electrode 116. That is, the second electrode 116 may be provided only on the surface of the outer wall of the rod-shaped body 118 or may be provided inside the outer wall.

The first electrode 114 and the second electrode 116 are arranged such that an AC voltage can be applied to or an AC current can be superimposed on the liquid under test in the space extending between an arbitrary first position 102a of the pipe 102 and a second position 102b shifted from the first position 102a in the direction of extension of the pipe 102. The first electrode 114 and the second electrode 116 of the present embodiment have an elongated shape extending in the direction of extension of the pipe 102. Therefore, the pair of electrodes extend parallel to the axial center of the pipe 102, spaced apart in the radial direction of the pipe 102. Preferably, the pair of electrodes are arranged such that the distance between the pair of electrodes is equal at any position in the direction of extension of the pipe 102.

Thereby, an AC voltage can be applied to or an AC current can be superimposed on the entire liquid under test spreading in the direction of extension of the pipe 102 between the first position 102a and the second position 102b, and, in other words, in the direction of flow of the liquid under test. The distance between the first position 102a and the second position 102b, and, in other words, the length of the first electrode 114 and the second electrode 116 in the direction of extension of the pipe 102 is, for example, equal to or greater than the distance between the pair of electrodes, and, in other words, the diameter of the pipe 102, for example.

Further, the rod-shaped body 118 is arranged such that the distance to the inner wall of the pipe 102 is substantially equal at each position in the direction of extension of the pipe 102. That is, the rod-shaped body 118 extends parallel to the axial center of the pipe 102. Thereby, the distance between the pair of electrodes (the distance in the radial direction of the pipe 102) can be made substantially equal in the direction of extension of the pipe 102. As a result, the accuracy of detection of conductive impurities by the impurity detection support device 100 can be increased. Further, the rod-shaped body 118 is arranged such that the distance to the inner wall of the pipe 102 is substantially equal at each position in the circumferential direction of the rod-shaped body 118. That is, the pipe 102 and the rod-shaped body 118 are arranged coaxially. Thereby, the distance between the pair of electrodes can be made substantially equal in the circumferential direction of the rod-shaped body 118. As a result, the accuracy of detection of conductive impurities by the impurity detection support device 100 can be increased. Stated otherwise, the rod-shaped body 118 constituting the second electrode 116 extends, by being inserted into the center of the pipe 102, without being deviated in the radial direction of the pipe 102 and parallel to the direction of extension of the pipe 102 without tilting.

In the first example shown in FIG. 2A, the rod-shaped body 118 is a hollow body. The interior of the rod-shaped body 118 is sealed and does not allow the liquid under test to flow. In the second example shown in FIG. 2B, the rod-shaped body 118 is a solid body. By using a hollow or solid rod-shaped body 118, it is possible to suppress an increase in the pressure loss occurring due to the rod-shaped body 118 when the liquid under test passes through the pipe 102. In the third example shown in FIG. 2C, on the other hand, the rod-shaped body 118 is a tubular mesh. The liquid under test can flow in and out of the rod-shaped body 118 through the mesh opening while flowing in the pipe 102. By using the tubular mesh rod-shaped body 118, the contact area between the second electrode 116 and the liquid under test can be increased, and the accuracy of detection of conductive impurities by the impurity detection support device 100 can be increased.

The power supply unit 106 applies an AC voltage or superimposes an AC current between the first electrode 114 and the second electrode 116. The power supply unit 106 can be configured by a known AC/DC converter, inverter, control circuit, or the like. For example, the first electrode 114 is connected to the negative electrode output terminal of the power supply unit 106, and the second electrode 116 is connected to the positive electrode output terminal of the power supply unit 106. Therefore, the first electrode 114 is the negative electrode, and the second electrode 116 is the positive electrode. The first electrode 114 may be the positive electrode, and the second electrode 116 may be the negative electrode. The control circuit is composed of, for example, a microcomputer and can control, according to a measurement result of the measurement unit 108, each switching element of the power supply unit 106 so that the current or the voltage maintains the target value.

The measurement unit 108 measures the current generated between the first electrode 114 and the second electrode 116 due to the application of the AC voltage. Alternatively, the measurement unit 108 measures the voltage generated between the first electrode 114 and the second electrode 116 due to the superposition of the AC current. For measurement of the current generated between the pair of electrodes, the measurement unit 108 can be configured by a known ammeter, FRA (Frequency Response Analyzer), or the like electrically connected to the pair of electrodes. For measurement of the voltage generated between the pair of electrodes, the measurement unit 108 can be configured by a known voltmeter, FRA, or the like electrically connected to the pair of electrodes.

The calculation unit 110 calculates the resistance of the liquid under test by using the measurement result of the measurement unit 108. As an example, the calculation unit 110 calculates the resistance of the liquid under test by the AC impedance method.

When the power supply unit 106 applies the AC voltage between the pair of electrodes, the current generated between the pair of electrodes via the liquid under test is measured by the measurement unit 108. In this case, the calculation unit 110 can calculate the resistance component of the liquid under test from the value of this current and the value of the AC voltage applied between the pair of electrodes. The magnitude of the applied AC voltage can be appropriately selected according to the electrode area, the distance between the electrodes, the type of the liquid under test, and the like, and is preferably 1-100 mV, and, more preferably 5-50 mV. The application time of the AC voltage is not particularly limited. The AC voltage may be biased.

Further, when the power supply unit 106 superimposes the AC current between the pair of electrodes, the voltage generated between the pair of electrodes via the liquid under test is measured by the measurement unit 108. In this case, the calculation unit 110 can calculate the resistance component of the liquid under test from the value of this voltage and the value of the AC current superimposed between the pair of electrodes. The magnitude of the AC current superimposed can be appropriately selected according to the electrode area, the distance between the electrodes, the type of the liquid under test, and the like, and is preferably 5 nA-5 A, and, more preferably, 50 nA-500 mA. The superposition time of the AC current is not particularly limited. The AC current may be biased.

In particular, it is preferable to apply the AC voltage between the pair of electrodes to calculate the resistance of the liquid under test by the AC impedance method. The AC frequency can be appropriately selected according to the electrode area, the distance between the electrodes, the type of the liquid under test, and the like, and is preferably 1 Hz-1000000 Hz, and, more preferably 10000 Hz-1000000 Hz. Thereby, the time required for calculating the resistance can be shortened, and the accuracy of resistance calculation can be further improved.

When conductive impurities such as metals are mixed in the solid-liquid mixture that is the liquid under test, the resistance of the liquid under test is reduced regardless of whether the impurities are magnetic or non-magnetic. That is, the resistance of the liquid under test is an indicator for determining whether or not the liquid under test contains conductive impurities. Therefore, it is possible to detect contamination by conductive impurities by capturing the change in resistance of the liquid under test flowing in the pipe 102 by resistance measurement according to the AC impedance method.

The determination unit 112 determines whether or not the liquid under test contains conductive impurities according to the resistance calculated by the calculation unit 110. For example, the determination unit 112 stores the resistance value of the liquid under test that does not contain conductive impurities in advance as a reference value. The determination unit 112 compares the resistance calculated by the calculation unit 110 with the reference value. When the difference between the calculated resistance and the reference value exceeds a predetermined threshold value, the determination unit 112 determines that the liquid under test contains conductive impurities. The threshold value can be appropriately set based on an experiment or simulation by the designer. For example, the threshold value may be zero.

Alternatively, the determination unit 112 may determine whether or not the liquid under test contains conductive impurities as follows. That is, the electrode unit 104 of the present embodiment generates an electric field in the liquid under test in the space spreading between the first position 102a and the second position 102b. Thereby, the AC voltage can be continuously applied to or the AC current can be continuously superimposed on the liquid under test for a predetermined continuous period of time rather than instantaneously. The power supply unit 106 changes the frequency of the AC voltage or the AC current applied to or superimposed on the liquid under test continuously or stepwise. The measurement unit 108 measures the current or the voltage generated between the pair of electrodes at a plurality of different frequencies. Thereby, the calculation unit 110 can calculate the resistance of the liquid under test at each frequency. The determination unit 112 determines the presence or absence of conductive impurities according to the plurality of resistances calculated by the calculation unit 110. For example, the determination unit 112 determines whether or not the difference of the resistance value at each frequency from the corresponding reference value exceeds a threshold value. Then, the determination unit 112 synthesizes these determination results and determines the presence or absence of conductive impurities. For example, the determination unit 112 determines the presence or absence of conductive impurities according to the number of times that the threshold value is exceeded. Thereby, the accuracy of detection of conductive impurities can be increased.

The determination unit 112 may also determine the presence or absence of conductive impurities based on the size of an arc in an equivalent circuit model obtained by the AC impedance method. Furthermore, the determination unit 112 may determine the presence or absence of conductive impurities according to the capacitance (electrostatic capacitance) of the liquid under test in addition to the resistance of the liquid under test.

As an example, the determination result of the determination unit 112 is sent to the control device 24. The control device 24 may display the determination result of the determination unit 112 on a monitor (not shown). Further, when it is determined by the determination unit 112 that the liquid under test contains conductive impurities, the control device 24 may notify the user of the impurity detection support device 100 of the determination result by a known notification method. The notification method is not particularly limited, and a known method such as generating an alert sound or turning on an alert lamp can be employed. Thereby, the user can monitor the presence or absence of conductive impurities in real time. In addition, the user can know contamination by conductive impurities more promptly.

Further, the value of the voltage or the current measured by the measurement unit 108 may be sent to the control device 24. The control device 24 may display a waveform of a voltage value or a current value on an oscilloscope (not shown). Further, the value of the resistance calculated by the calculation unit 110 may be sent to the control device 24. The control device 24 may display the resistance value on a monitor. The resistance value displayed on the monitor may be a plurality of resistance values obtained by changing the frequency of the AC voltage or the AC current. In this case, the user can determine the presence or absence of conductive impurities from the resistance value displayed on the monitor. When the resistance value itself is used by the user, the determination unit 112 may be omitted.

As an example, the execution of the impurity detection process can be directed by the user via the control device 24 or by an operation program in the control device 24. The same applies to a change in the setting of the impurity detection process. Further, the control device 24 may control the valve 4 and the pump 8.

Figure 3:
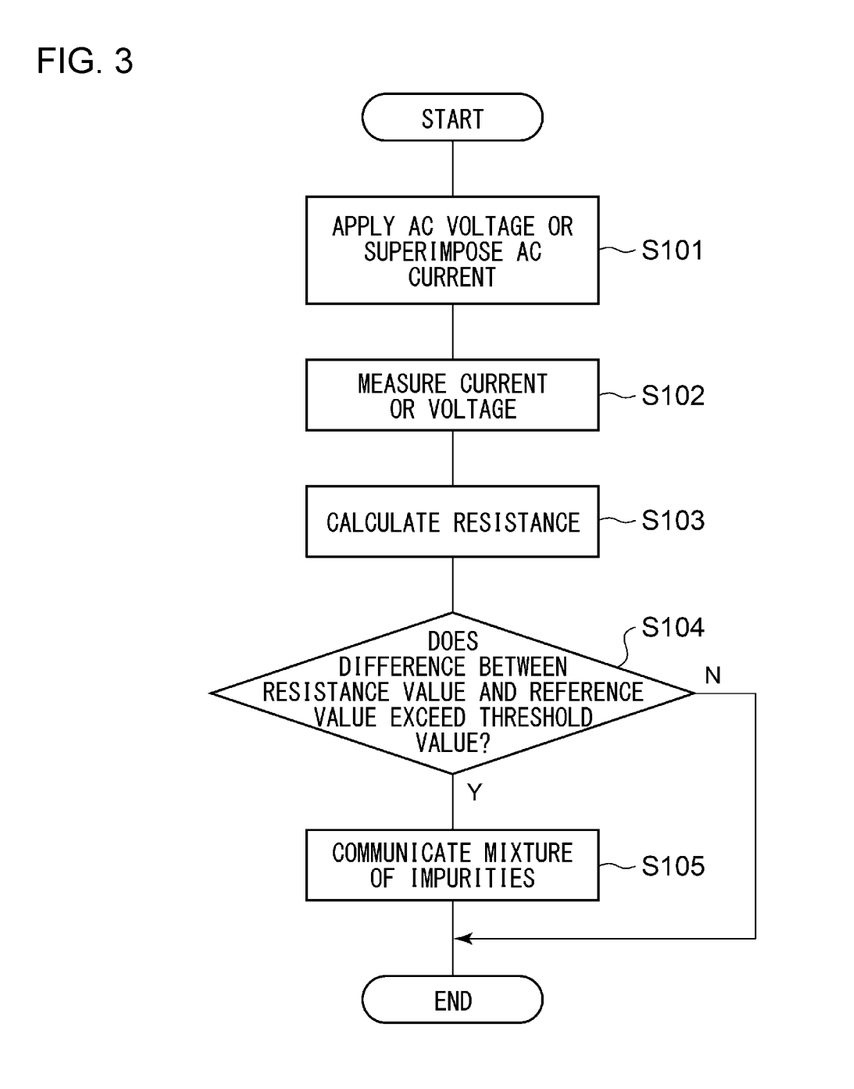
FIG. 3 is a flowchart showing an example of an impurity detection support method according to embodiment 1.

FIG. 3 is a flowchart showing an example of an impurity detection support method according to embodiment 1. This flow is repeatedly executed at, for example, a predetermined interval.

First, an AC voltage is applied or an AC current is superimposed between the first electrode 114 and the second electrode 116 (S101). Next, the current generated between the first electrode 114 and the second electrode 116 due to the application of the AC voltage is measured, or the voltage generated between the first electrode 114 and the second electrode 116 due to the superposition of the AC current is measured (S102). Subsequently, the resistance of the liquid under test is calculated based on the measured current or voltage (S103). It is then determined whether the difference between the calculated resistance value and the reference value exceeds the threshold value (S104).

When the difference between the resistance value and the reference value exceeds the threshold value (Y of S104), the user is notified that the liquid under test contains impurities (S105), and the routine ends. When the difference between the resistance value and the reference value is equal to or less than the threshold value (N in S104), the user is not notified, and the routine ends. In step S104, the determination as to whether or not the difference between one resistance value and the reference value exceeds the threshold value is defined as a determination as to whether or not the liquid under test contains conductive impurities. Alternatively, a determination as to whether or not the difference from the reference value exceeds the threshold value may be made for a plurality of resistance values obtained by changing the frequency of the AC voltage or the AC current, and a plurality of determination results may be synthesized to determine whether or not conductive impurities are contained.

As described above, the impurity detection support device 100 according to the embodiment includes: a pipe 102 in which a liquid under test flows; a first electrode 114 and a second electrode 116 provided in the pipe 102, the first electrode 114 and the second electrode 116 being arranged such that an AC voltage is adapted to be applied to or an AC current is adapted to be superimposed on the liquid under test in the space extending between a first position 102a in the pipe 102 and a second position 102b shifted from the first position 102a in a direction of extension of the pipe 102, i.e., to the entirety of the liquid under test spread in the space; a power supply unit 106 that applies an AC voltage or superimposes an AC current between the pair of electrodes; a measurement unit 108 that measures a current generated between the pair of electrodes due to application of the AC voltage or measures a voltage generated between the pair of electrodes due to superposition of the AC current; and a calculation unit 110 that calculates a resistance of the liquid under test by using a measurement result of the measurement unit 108, the resistance being an indicator for determining whether or not the liquid under test contains conductive impurities.

The impurity detection support device 100 of the present embodiment measures a resistance that serves as an indicator for determining the presence or absence of conductive impurities by applying an AC voltage to or superimposing an AC current on the liquid under test. Therefore, a highly reliable determination indicator can be obtained even if the impurities are non-magnetic. Accordingly, the rate of detection of conductive impurities in the liquid under test can be increased. Further, since an electric field is generated in the liquid under test flowing in the pipe 102, conductive impurities can be detected while the liquid under test is being transported. In other words, an in-line impurity detection process can be realized. In addition, complete inspection of the liquid under test can be easily realized since a work such as sample collection is not required. Therefore, it is possible to suppress introduction of foreign matter into the subsequent process.

Further, an AC voltage is applied to or an AC current is superimposed on the liquid under test in the space extending between the first position 102a of the pipe 102 and the second position 102b shifted from the first position 102a in the direction of extension of the pipe. This can spread a region where conductive impurities are energized in the direction of flow of the liquid under test and so increase the efficiency of detection of conductive impurities.

By way of example, the liquid under test is an electrode slurry containing a solvent and at least one of an electrode active material or a conductive additive. In this case, it is possible to suppress a short circuit between the positive and negative electrodes caused by conductive impurities themselves by detecting conductive impurities with high accuracy. If the positive electrode slurry contains conductive impurities (particularly, metal impurities) in a power storage device in which an electrolytic solution is interposed between the positive and negative electrodes, conductive impurities could elute in the electrolytic solution when the power storage device is charged, resulting in reduction and precipitation on the surface of the negative electrode. When this precipitation is repeated, conductive impurities could grow in a dendrite shape, penetrate the separator, and reach the positive electrode, causing a short circuit. Therefore, it is also possible to suppress a short circuit caused by a dendrite, by increasing the rate of detection of conductive impurities.

As an example, the pipe 102 is provided in the coating device 1 including the coating die 2 for applying the liquid under test to the coated body 16 and the tank 6 for storing the liquid under test. Alternatively, the pipe 102 is provided in a circulation device or a transport device for the liquid under test. Thereby, the impurity detection process can be performed in the process of transporting the liquid under test from the tank 6 to the coating die 2. Further, the impurity detection process can be applied to the liquid under test until just before the liquid under test is applied to the coated body 16, by arranging the impurity detection support device 100 in the feed pipe 10 or the die supply pipe 14 of the coating device 1. Thereby, the risk of foreign matter contamination in the electronic device can be further reduced, and the performance of the electronic device can be further improved.

Further, the impurity detection support device 100 can be mounted in an existing device simply by using a part of the pipe in the existing device as the pipe 102, or by replacing a part of the pipe by the pipe 102 of the impurity detection support device 100. Therefore, the installation, replacement, and maintenance of the impurity detection support device 100 are easy.

Further, the impurity detection support device 100 of the present embodiment includes the determination unit 112 that determines whether or not the liquid under test contains conductive impurities according to the resistance calculated by the calculation unit 110. Thereby, the user can know contamination by conductive impurities more promptly.

Further, as an example of determining whether or not conductive impurities are included, the frequency of the AC voltage applied or the AC current superimposed by the power supply unit 106 is changed continuously or stepwise, the measurement unit 108 measures the current or the voltage at different frequencies, the calculation unit 110 calculates a plurality of resistances from the current or the voltage at the respective frequencies, and the determination unit 112 determines whether or not conductive impurities are included according to a plurality of resistances. Thereby, the accuracy of detection of conductive impurities can be further improved.

Further, the first electrode 114 and the second electrode 116 of the present embodiment have an elongated shape extending in the direction of extension of the pipe 102. Thereby, the area where the electric field is generated can be spread in the direction of extension of the pipe 102 more easily. Further, the first electrode 114 is provided in the pipe 102, and the second electrode 116 is provided in the rod-shaped body 118 inserted into the pipe 102. The rod-shaped body 118 is arranged at an interval from the pipe 102. Further, rod-shaped body 118 extends parallel to the axial center of the pipe 102. Thereby, it can be made easy to keep the distance between the pairs of electrodes uniform in all regions and generate an electric field more uniformly in all regions, even when the region in which the electric field is generated is spread in the direction of extension of the pipe 102. Further, the rod-shaped body 118 is a hollow body, a solid body, or a tubular mesh. When the rod-shaped body 118 is a hollow body or a solid body, it is possible to suppress an increase in pressure loss occurring when the liquid under test passes through the pipe 102. When the rod-shaped body 118 is a tubular mesh, the contact area between the second electrode 116 and the liquid under test can be increased to increase the rate of detection of impurities.

Embodiment 2

Embodiment 2 has a configuration common to that of the first embodiment except for the shape and arrangement of the first electrode 114 and the second electrode 116. The following description of the present embodiment highlights the difference from embodiment 1. A description of common features is given only briefly or omitted.

Figure 4A:
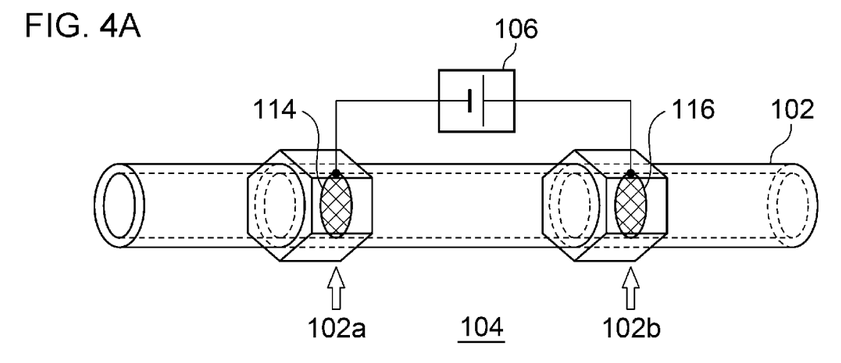
FIGS. 4A, 4B and 4C are schematic diagrams of the electrode unit provided in the impurity detection support device according to embodiment 2.
Figure 4B:
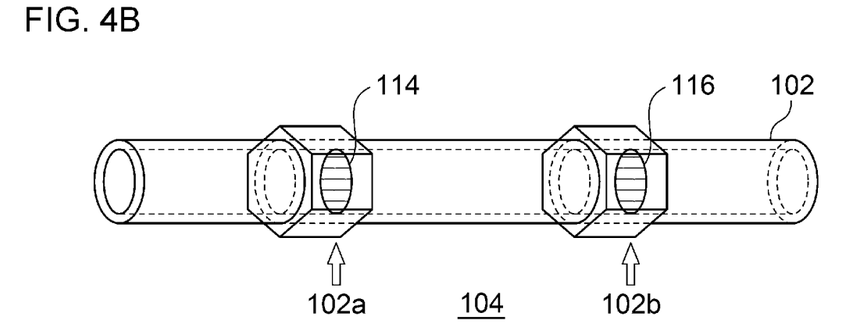
Figure 4C:
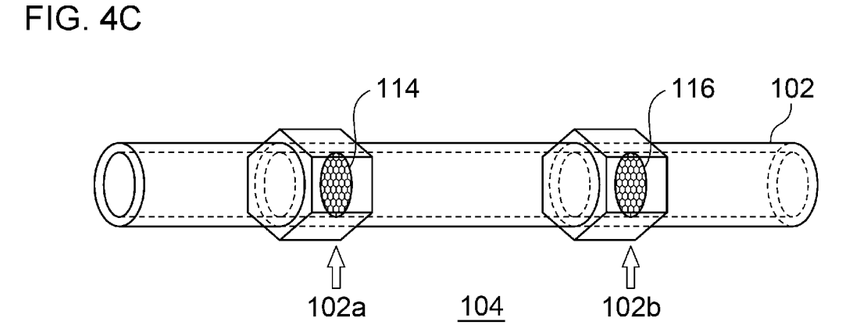

FIGS. 4A-4C are schematic diagrams of the electrode unit 104 provided in the impurity detection support device 100 according to embodiment 2. FIG. 4A shows a fourth example of the electrode unit 104, FIG. 4B is a fifth example of the electrode unit 104, and FIG. 4C shows a sixth example of the electrode unit 104. In FIGS. 4B and 4C, illustration of the power supply unit 106 is omitted.

In the present embodiment, the first electrode 114 extends at the first position 102a in a direction intersecting the direction of extension of the pipe 102. Further, the second electrode 116 extends at the second position 102b in a direction intersecting the direction of extension of the pipe 102. That is, the pair of electrodes have a filter shape and extend in the radial direction of the pipe 102. Thereby, the region in which conductive impurities are energized can be spread in a direction intersecting the direction of flow of the liquid under test so that the efficiency of detection of conductive impurities can be increased.

The first electrode 114 and the second electrode 116 are, for example, fixed to the pipe 102. When the pipe 102 is made of a metal, insulation is provided between each electrode and the pipe 102. When the pipe 102 is non-metallic, insulation between each electrode and the pipe 102 can be omitted, and the electrode and the pipe 102 may be in direct contact with each other.

In the fourth example shown in FIG. 4A, the first electrode 114 and the second electrode 116 are mesh sheets. In the fifth example shown in FIG. 4B, the first electrode 114 and the second electrode 116 are slit sheets. In the sixth example shown in FIG. 4C, the first electrode 114 and the second electrode 116 are porous sheets. The liquid under test flowing in the pipe 102 can travel downstream from each electrode through the mesh of each electrode. By configuring each electrode to have a filter shape, the contact area between each electrode and the liquid under test can be increased, and the accuracy of detection of conductive impurities by the impurity detection support device 100 can be increased.

The embodiments of the present disclosure are described above in detail. The embodiments described above are merely specific examples of practicing the present disclosure. The details of the embodiments shall not be construed as limiting the technical scope of the present disclosure. A number of design modifications such as modification, addition, deletion, etc. of constituting elements may be made to the extent that they do not depart from the idea of the present disclosure defined by the claims. New embodiments with design modifications will provide the combined advantages of the embodiment and the variation. Although the details subject to such design modification are emphasized in the embodiment described above by using phrases such as "of this embodiment" and "in this embodiment", details not referred to as such are also subject to design modification. Any combination of the above constituting elements is also useful as a mode of the present disclosure. Hatching in the cross section in the drawings should not be construed as limiting the material of the hatched object.

The inventions according to the embodiments described above may be defined by the following items.

[Item 1] An impurity detection support device (100) including:
  a pipe (102) in which a liquid under test flows;
  a first electrode (114) and a second electrode (116) provided in the pipe (102), the first electrode (114) and the second electrode (116) being arranged such that an AC voltage is adapted to be applied to or an AC current is adapted to be superimposed on the liquid under test in a space extending between a first position (102a) of the pipe (102) and a second position (102b) shifted from the first position (102a) in a direction of extension of the pipe (102);
  a power supply unit (106) that applies an AC voltage or superimposes an AC current between the first electrode (114) and the second electrode (116);
  a measurement unit (108) that measures a current generated between the first electrode (114) and the second electrode (116) due to application of the AC voltage or measures a voltage generated between the first electrode (114) and the second electrode (116) due to superposition of the AC current; and
  a calculation unit (110) that calculates a resistance of the liquid under test using a measurement result of the measurement unit (108), the resistance being an indicator for determining whether or not the liquid under test contains conductive impurities.

[Item 2] The impurity detection support device (100) according to item 1, including: a determination unit (112) that determines whether or not the liquid under test contains conductive impurities according to the resistance calculated by the calculation unit (110).

[Item 3] The impurity detection support device (100) according to item 2, wherein
  the power supply unit (106) changes a frequency of a voltage applied or a current superimposed continuously or stepwise,
  the measurement unit (108) measures a current or a voltage at different frequencies,
  the calculation unit (110) calculates a plurality of resistances from currents or voltages at respective frequencies, and
  the determination unit (112) determines whether or not conductive impurities are contained according to the plurality of resistances.

[Item 4] The impurity detection support device (100) according to any one of items 1 through 3, wherein the first electrode (114) and the second electrode (116) have an elongated shape extending in the direction of extension.

[Item 5] The impurity detection support device (100) according to item 4, wherein
the first electrode (114) is provided in the pipe (102), and
the second electrode (116) is provided in a rod-shaped body (118) that is inserted into the pipe (102) and arranged at an interval from the pipe (102).

[Item 6] The impurity detection support device according to item 5, wherein
the rod-shaped body (118) extends parallel to an axial center of the pipe (102).

[Item 7] The impurity detection support device (100) according to item 5 or 6, wherein
the rod-shaped body (118) is a hollow body, a solid body, or a tubular mesh.

[Item 8] The impurity detection support device (100) according to any one of items 1 through 3, wherein
the first electrode (114) extends at the first position (102a) in a direction intersecting the direction of extension, and
the second electrode (116) extends at the second position (102b) in a direction intersecting the direction of extension.

[Item 9] The impurity detection support device (100) according to item 8, wherein
the first electrode (114) and the second electrode (116) are mesh sheets, slit sheets, or porous sheets.

[Item 10] The impurity detection support device (100) according to any one of items 1 through 9, wherein
the liquid under test is an electrode slurry containing a solvent and at least one of an electrode active material or a conductive additive.

[Item 11] The impurity detection support device (100) according to any one of items 1 through 10, wherein
the pipe (102) is provided in at least one of a coating device (1) that coats a coated body (16) with the liquid under test, a circulation device for the liquid under test, or a transport device for the liquid under test.

[Item 12] An impurity detection support method comprising:
causing a liquid under test to flow in a pipe (102);
applying an AC voltage to or superimposing an AC current on the liquid under test in a space extending between a first position (102a) of the pipe (102) and a second position (102b) shifted from the first position (102a) in a direction of extension of the pipe (102);
measuring a current generated due to application of the AC voltage or measuring a voltage generated due to superposition of the AC current; and
calculating a resistance of the liquid under test using a measurement result, the resistance being an indicator for determining whether or not the liquid under test contains conductive impurities.

[Item 13] The impurity detection support method according to item 12, including:
determining whether or not the liquid under test contains conductive impurities according to the resistance calculated.

[Item 14] The impurity detection support method according to item 13, wherein
in the applying of the AC voltage or superimposing the AC current, a frequency of the AC voltage or the AC current is changed continuously or in steps,
in the measuring, a current or a voltage is measured at different frequencies,
in the calculating, a plurality of resistances are calculated from currents or voltages at respective frequencies, and
in the determining, it is determined whether or not conductive impurities are contained according to the plurality of resistances.

The invention claimed is:

1. A coating device that coats a coated body of a battery with an electrode slurry under test, the coating device comprising: an impurity detection support device,
wherein the impurity detection support device includes:
a pipe in which the electrode slurry under test flows, the electrode slurry containing a solvent and at least one of an electrode active material or a conductive additive;
a first electrode and a second electrode arranged in the pipe such that an AC voltage is adapted to be applied to or an AC current is adapted to be superimposed on the electrode slurry under test in a space extending between a first position of the pipe and a second position shifted from the first position in a direction of extension of the pipe;
a power supply unit that applies an AC voltage or superimposes an AC current between the first electrode and the second electrode;
a measurement unit that measures a current generated between the first electrode and the second electrode due to application of the AC voltage or measures a voltage generated between the first electrode and the second electrode due to superposition of the AC current; and
a calculation unit that calculates a resistance of the electrode slurry under test using a measurement result of the measurement unit, the resistance being an indicator for determining whether or not the electrode slurry under test contains conductive impurities.

2. A circulation device for circulating an electrode slurry for coating a coated body of a battery, the electrode slurry being under test, the circulation device comprising: an impurity detection support device,
wherein the impurity detection support device includes:
a pipe in which the electrode slurry under test flows, the electrode slurry containing a solvent and at least one of an electrode active material or a conductive additive;
a first electrode and a second electrode arranged in the pipe such that an AC voltage is adapted to be applied to or an AC current is adapted to be superimposed on the electrode slurry under test in a space extending between a first position of the pipe and a second position shifted from the first position in a direction of extension of the pipe;
a power supply unit that applies an AC voltage or superimposes an AC current between the first electrode and the second electrode;
a measurement unit that measures a current generated between the first electrode and the second electrode due to application of the AC voltage or measures a voltage generated between the first electrode and the second electrode due to superposition of the AC current; and
a calculation unit that calculates a resistance of the electrode slurry under test using a measurement result of the measurement unit, the resistance being an indicator for determining whether or not the electrode slurry under test contains conductive impurities.

3. A transport device for transporting an electrode slurry for coating a coated body of a battery, the electrode slurry being under test, the transport device comprising: an impurity detection support device,
wherein the impurity detection support device includes:
a pipe in which the electrode slurry under test flows, the electrode slurry containing a solvent and at least one of an electrode active material or a conductive additive;
a first electrode and a second electrode arranged in the pipe such that an AC voltage is adapted to be applied to or an AC current is adapted to be superimposed on the liquid electrode slurry under test in a space extending between a first position of the pipe and a second position shifted from the first position in a direction of extension of the pipe;
a power supply unit that applies an AC voltage or superimposes an AC current between the first electrode and the second electrode;
a measurement unit that measures a current generated between the first electrode and the second electrode due to application of the AC voltage or measures a voltage generated between the first electrode and the second electrode due to superposition of the AC current; and
a calculation unit that calculates a resistance of the electrode slurry under test using a measurement result of the measurement unit, the resistance being an indicator for determining whether or not the electrode slurry under test contains conductive impurities.

4. The coating device according to claim 1, wherein the impurity detection support device includes a determination unit that determines whether or not the electrode slurry under test contains conductive impurities according to the resistance calculated by the calculation unit.

5. The circulation device according to claim 2, wherein the impurity detection support device includes a determination unit that determines whether or not the electrode slurry under test contains conductive impurities according to the resistance calculated by the calculation unit.

6. The transport device according to claim 3, wherein the impurity detection support device includes a determination unit that determines whether or not the electrode slurry under test contains conductive impurities according to the resistance calculated by the calculation unit.

7. The coating device according to claim 4,
wherein the power supply unit changes a frequency of the AC voltage applied or the AC current superimposed continuously or in steps,
wherein the measurement unit measures a current or a voltage at different frequencies,
wherein the calculation unit calculates a plurality of resistances from currents or voltages at respective frequencies, and
wherein the determination unit determines whether or not conductive impurities are contained according to the plurality of resistances.

8. The circulation device according to claim 5,
wherein the power supply unit changes a frequency of the AC voltage applied or the AC current superimposed continuously or in steps,
wherein the measurement unit measures a current or a voltage at different frequencies,
wherein the calculation unit calculates a plurality of resistances from currents or voltages at respective frequencies, and
wherein the determination unit determines whether or not conductive impurities are contained according to the plurality of resistances.

9. The transport device according to claim 6,
wherein the power supply unit changes a frequency of the AC voltage applied or the AC current superimposed continuously or in steps,
wherein the measurement unit measures a current or a voltage at different frequencies,
wherein the calculation unit calculates a plurality of resistances from currents or voltages at respective frequencies, and
wherein the determination unit determines whether or not conductive impurities are contained according to the plurality of resistances.

10. The coating device according to claim 1, wherein the first electrode and the second electrode have an elongated shape extending in the direction of extension.

11. The circulation device according to claim 2, wherein the first electrode and the second electrode have an elongated shape extending in the direction of extension.

12. The transport device according to claim 3, wherein the first electrode and the second electrode have an elongated shape extending in the direction of extension.

13. The coating device according to claim 10,
wherein the first electrode is provided in the pipe, and
wherein the second electrode is provided in a rod-shaped body that is inserted into the pipe and arranged at an interval from the pipe.

14. The circulation device according to claim 11,
wherein the first electrode is provided in the pipe, and
wherein the second electrode is provided in a rod-shaped body that is inserted into the pipe and arranged at an interval from the pipe.

15. The transport device according to claim 12,
wherein the first electrode is provided in the pipe, and
wherein the second electrode is provided in a rod-shaped body that is inserted into the pipe and arranged at an interval from the pipe.

16. The coating device according to claim 13, wherein the rod-shaped body extends parallel to an axial center of the pipe.

17. The circulation device according to claim 14, wherein the rod-shaped body extends parallel to an axial center of the pipe.

18. The transport device according to claim 15, wherein the rod-shaped body extends parallel to an axial center of the pipe.

19. The coating device according to claim 13, wherein the rod-shaped body is a hollow body, a solid body, or a tubular mesh.

20. The circulation device according to claim 14, wherein the rod-shaped body is a hollow body, a solid body, or a tubular mesh.

21. The transport device according to claim 15, wherein the rod-shaped body is a hollow body, a solid body, or a tubular mesh.

22. The coating device according to claim 1,
wherein the first electrode extends at the first position in a direction intersecting the direction of extension, and
wherein the second electrode extends at the second position in the direction intersecting the direction of extension.

23. The circulation device according to claim 2,
wherein the first electrode extends at the first position in a direction intersecting the direction of extension, and wherein the second electrode extends at the second position in the direction intersecting the direction of extension.

24. The transport device according to claim 3,
wherein the first electrode extends at the first position in a direction intersecting the direction of extension, and
wherein the second electrode extends at the second position in the direction intersecting the direction of extension.

25. The coating device according to claim 22, wherein the first electrode and the second electrode are mesh sheets, slit sheets, or porous sheets.

26. The circulation device according to claim 23, wherein the first electrode and the second electrode are mesh sheets, slit sheets, or porous sheets.

27. The transport device according to claim 24, wherein the first electrode and the second electrode are mesh sheets, slit sheets, or porous sheets.

\* \* \* \* \*